(12) United States Patent
Hayashi

(10) Patent No.: US 7,098,620 B2
(45) Date of Patent: Aug. 29, 2006

(54) MINUTE OBJECT MANIPULATING APPARATUS

(75) Inventor: Tadashi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 10/803,925

(22) Filed: Mar. 19, 2004

(65) Prior Publication Data

US 2004/0193305 A1 Sep. 30, 2004

(30) Foreign Application Priority Data

Mar. 31, 2003 (JP) .................................... 2003-094832

(51) Int. Cl.
*G02B 21/32* (2006.01)
*B25J 13/00* (2006.01)

(52) U.S. Cl. ................ 318/568.11; 318/568.22; 318/619; 318/632

(58) Field of Classification Search ............ 318/568.11, 318/568.21, 568.22, 609, 610, 619, 621, 318/632

See application file for complete search history.

(56) References Cited

U.S. PATENT DOCUMENTS

| | | | | |
|---|---|---|---|---|
| 4,316,087 A | * | 2/1982 | Yanaka et al. | ............ 250/307 |
| 4,412,246 A | * | 10/1983 | Allen et al. | ................ 348/79 |
| 5,216,500 A | * | 6/1993 | Krummey et al. | ............ 348/79 |
| 5,480,804 A | * | 1/1996 | Niwa et al. | ............... 435/286.1 |
| 5,729,015 A | * | 3/1998 | Tong | ............................ 250/306 |
| 6,337,472 B1 | * | 1/2002 | Garner et al. | ............ 250/201.3 |
| 6,407,560 B1 | * | 6/2002 | Walraven et al. | ............ 324/752 |
| 6,876,399 B1 | * | 4/2005 | Masuyama et al. | ......... 348/649 |

FOREIGN PATENT DOCUMENTS

| | | |
|---|---|---|
| JP | 60-123974 | 7/1985 |
| JP | 5-323203 A | 12/1993 |
| JP | 09-211338 | 8/1997 |
| JP | 10-206749 | 8/1998 |
| JP | 2000-052289 | 2/2000 |
| JP | 2002-098897 | 4/2002 |
| JP | 2002-127060 | 5/2002 |

\* cited by examiner

*Primary Examiner*—Bentsu Ro
(74) *Attorney, Agent, or Firm*—Fitzpatrick, Cella, Harper & Scinto

(57) ABSTRACT

A minute object manipulating apparatus includes a tool which manipulates a manipulation target object, an observation unit capable of changing the magnification for observating the manipulation target object and tool, a display unit which displays magnified images of the manipulation target object and tool, which are observed by the observation unit, a command input unit to cause the operator to input the manipulation command signal of the tool, and a gain arithmetic unit which decides the manipulation gain of the tool on the basis of the magnification of the observation unit and magnified image information or pixel information on the display unit. The tool is driven and controlled on the basis of the manipulation gain and manipulation command signal.

10 Claims, 14 Drawing Sheets

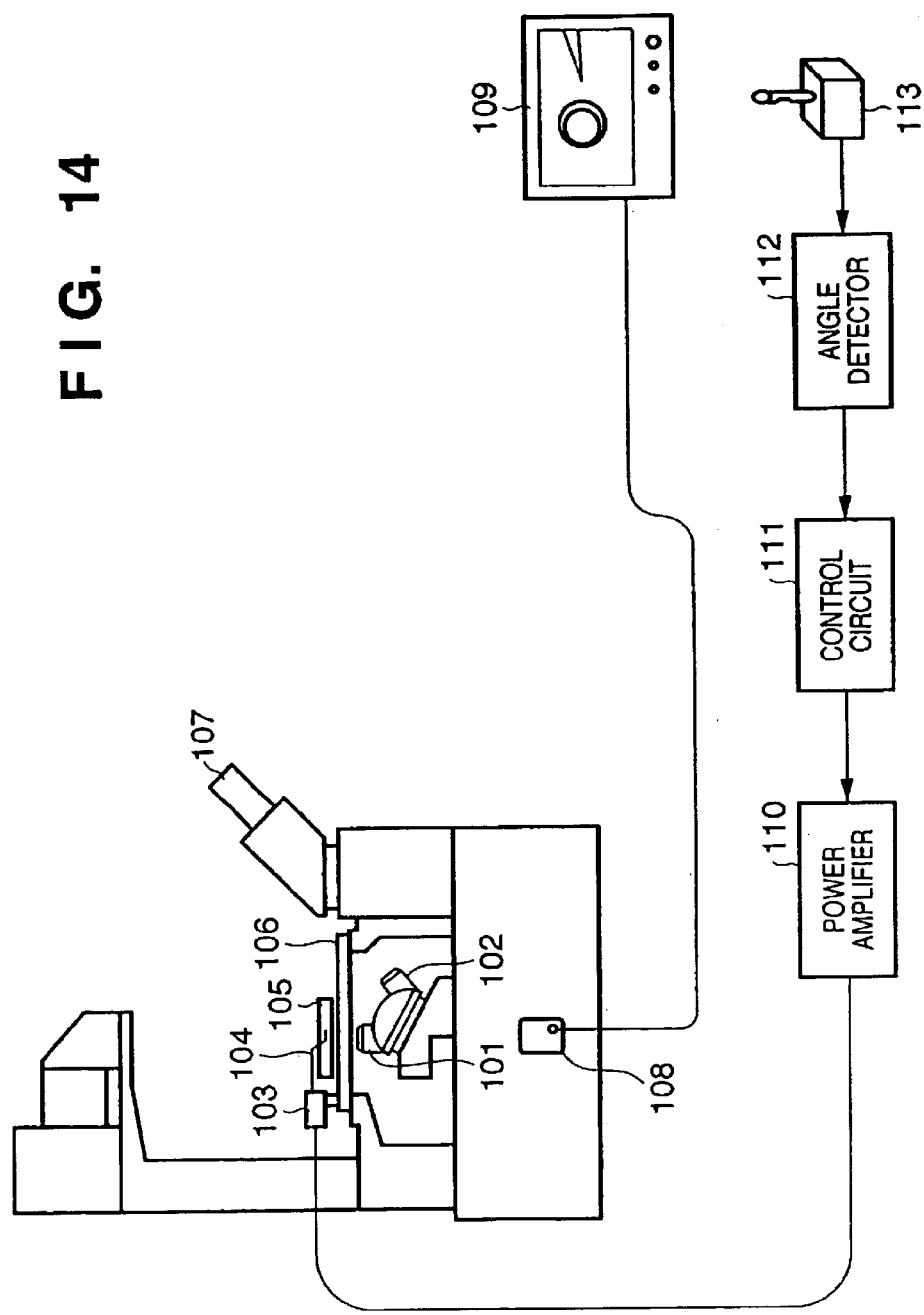

MINUTE OBJECT MANIPULATING APPARATUS

FIELD OF THE INVENTION

The present invention relates to a minute object manipulating apparatus which comprises a magnifying observation device such as an optical microscope, electron microscope, or scanning microscope, tools such as a perforator, micropipettes, injector, and stage device, which manipulate a minute object, and a tool driving manipulator, and a minute object manipulating method.

BACKGROUND OF THE INVENTION

A conventional apparatus which manipulates a minute object has an arrangement shown in FIG. 14 (Japanese Patent Laid-Open No. 5-323203). The apparatus shown in FIG. 14 has a micromanipulator 103 installed in an inverted microscope. The micromanipulator 103 is arranged near a stage 106 provided in the inverted microscope. The distal end of a perforator 104 as a tool is placed in a petri dish 105 mounted on the stage 106.

An objective lens 101 attached to a revolver 102 is arranged under the stage 106. The magnification is changed by rotating the revolver 102 to switch the lens to the objective lens 101 with another magnification power. Observation light which has passed through the objective lens 101 is converted into an electrical signal by a TV camera 108, sent to a monitor device 109, and displayed on it. Simultaneously, direct observation through an eyepiece 107 is also possible.

The apparatus also has a joystick 113 to be operated by an operator as the operation unit of the micromanipulator 103. The tilt direction and tilt angle of the joystick 113 are detected by an angle detector 112 and input to a CPU (control circuit) 111 as an electrical signal. The CPU 111 operates a power amplifier 110 in accordance with the signal from the angle detector 112 to drive the manipulator 103.

As a microscope, a microscope with a zoom lens is also known. When such a device is used, the magnification of an object can continuously be changed. Hence, as compared to the system which switches the objective lens 101 by the revolver 102 shown in FIG. 14, the work can smoothly be executed.

The prior art has the following problems because the observation system does not synchronize with the tools.

More specifically, when the work is done while switching the observation magnification, and the operator moves a tool (e.g., a perforator) by using a command value input means such as a joystick, the tool moving amount observed on the monitor changes even when the input value does not change.

In this case, the operator must perceive the observation magnification and adjust the input command, resulting in very cumbersome work. Especially, when the magnification power is increased, and the same command value as that for a low magnification power is input, the tool moves largely. This makes it difficult to perform fine manipulation.

Normally, the observable working space is small when the magnification power is high. For this reason, the tool or manipulation target object may move out of the visual field in the worst case. Conversely, when the gain is adjusted for minute manipulation, a problem is posed when the operator wants to largely move the tool under a low magnification.

SUMMARY OF THE INVENTION

The present invention has been made in consideration of the above problems, and has as its object to provide minute object manipulating apparatus and method which make it possible to smoothly execute work.

In order to solve the above problem, minute object manipulating apparatus according to the present invention is comprising a tool which manipulates a manipulation target object, observation means capable of changing a magnification for observating the manipulation target object and the tool, display means for displaying magnified images of the manipulation target object and the tool, which are observed by the observation means, command input means for causing an operator to input a manipulation command signal of the tool, and gain arithmetic means for deciding a driving gain to drive the tool on the basis of the magnification of the observation means and magnified image information or pixel information on the display means, wherein the tool is controlled on the basis of the driving gain and the manipulation command signal.

According to this arrangement, the driving gain of the tool is decided in consideration of both the magnification of the observation means and the magnified image information (pixel information) on the display means. Hence, a minute object manipulating apparatus can easily be implemented, which can cause the operator to smoothly execute work without feeling any sense of incompatibility or making a serious error independently of the magnification of the observation system (the magnification based on both the magnification of the observation means such as an optical microscope and the magnifying display adjustment ratio of the display means such as a monitor).

The display means can display a magnified image with a magnification of its own by appropriately changing the magnification of the observation means. The degree of change will be called a magnifying display adjustment ratio.

More detailed arrangements to be described below can be implemented on the basis of the above basic arrangement.

The observation means is a microscope capable of continuously changing the magnification or a microscope capable of discontinuously switching the magnification.

The apparatus may further comprise magnification detection means for detecting the magnification of the observation means by detecting the position of the optical system, in which the gain arithmetic means decides the driving gain of the tool on the basis of the information detected by the magnification detection means and the magnified image information (pixel information) on the display means.

The apparatus may further comprise tool driving signal generation means (tool control circuit) for generating a tool driving signal from the driving gain and manipulation command signal, and driving means (tool driving circuit) for driving the tool on the basis of the tool driving signal.

The gain arithmetic means can decide the manipulation gain by changing it in inverse proportion to a change in magnification obtained by multiplying the magnification of the observation means and the magnifying display adjustment ratio of the image on the display means.

As a typical example of this arrangement, a substantially predetermined relationship is held between the amount of the manipulation command signal from the command input means and the moving amount of the distal end of the tool displayed on the display means independently of the magnification of the observation means and the magnifying display adjustment ratio of the image on the display means.

More specifically, the gain arithmetic means can decide the driving gain in proportion to the reciprocal of a magnification obtained by multiplying the magnification of the observation means and the magnifying display adjustment ratio of the image on the display means.

The apparatus can further comprise storage means for storing tool driving information desired by the operator, and the tool can be controlled on the basis of the driving gain, the manipulation command signal, and the tool driving information in the storage means, which is desired by the operator. In this case, the driving gain is decided in proportion to, e.g., the reciprocal of the magnification obtained by multiplying the magnification of the observation means and the magnifying display adjustment ratio of the image on the display means, and an amount of the tool driving information in the storage means, which is desired by the operator.

The command input means can be input means for inputting the manipulation command signal by pointing the distal end position of the tool on the image on the display means. The command input means can be prepared for each of a plurality of tools.

An arrangement having visual control means for controlling the tool on the basis of the image information on the display means to automatically execute a job given by the operator can also be employed. In addition, the apparatus can be designed to, when the manipulation target object or tool moves out of the image visual field of the display means, automatically decrease the magnification of the observation means or the magnifying display adjustment ratio of the image on the display means, thereby synchronously increasing the driving gain of the tool.

The tool can include at least one of, e.g., a stage which moves with the manipulation target placed on it, gripping means, perforation means, suction means, cutting means, and an injector.

In order to solve the above problem, a minute object manipulating method according to the present invention is wherein a tool is driven and controlled on the basis of a magnification of observation means capable of changing the magnification for observating a manipulation target object and the tool, image information (pixel information) on display means for displaying magnified images of the manipulation target object and the tool, which are observed by the observation means, and a manipulation command signal of the tool, which is input by an operator, so as to ensure a substantially predetermined relationship between an amount of the manipulation command signal from command input means and a moving amount of a distal end of the tool displayed on the display means independently of the magnification of the observation means and a magnifying display adjustment ratio of the image on the display means.

According to this method, the tool is driven and controlled by the above mode on the basis of the manipulation command signal of the tool while considering both the magnification of the observation means and the magnified image information (pixel information) on the display means. Hence, the operator can smoothly execute work without feeling any sense of incompatibility or making a serious error.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

(First Embodiment)

Figure 1:
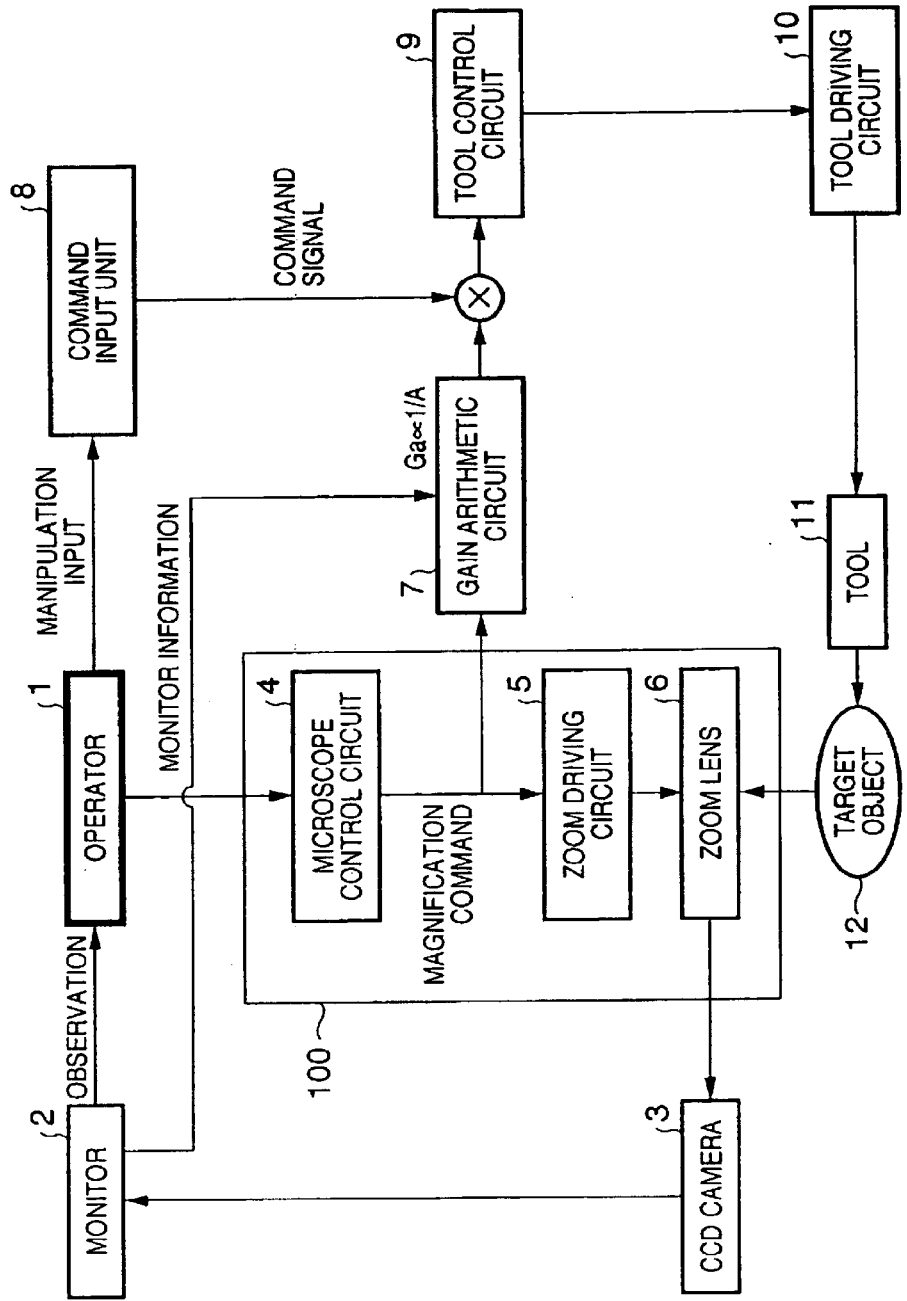
FIG. 1 is a block diagram showing the arrangement of the first embodiment of the present invention.

FIG. 1 is a block diagram showing the arrangement of a minute object manipulating apparatus according to the first embodiment of the present invention.

Figure 14:
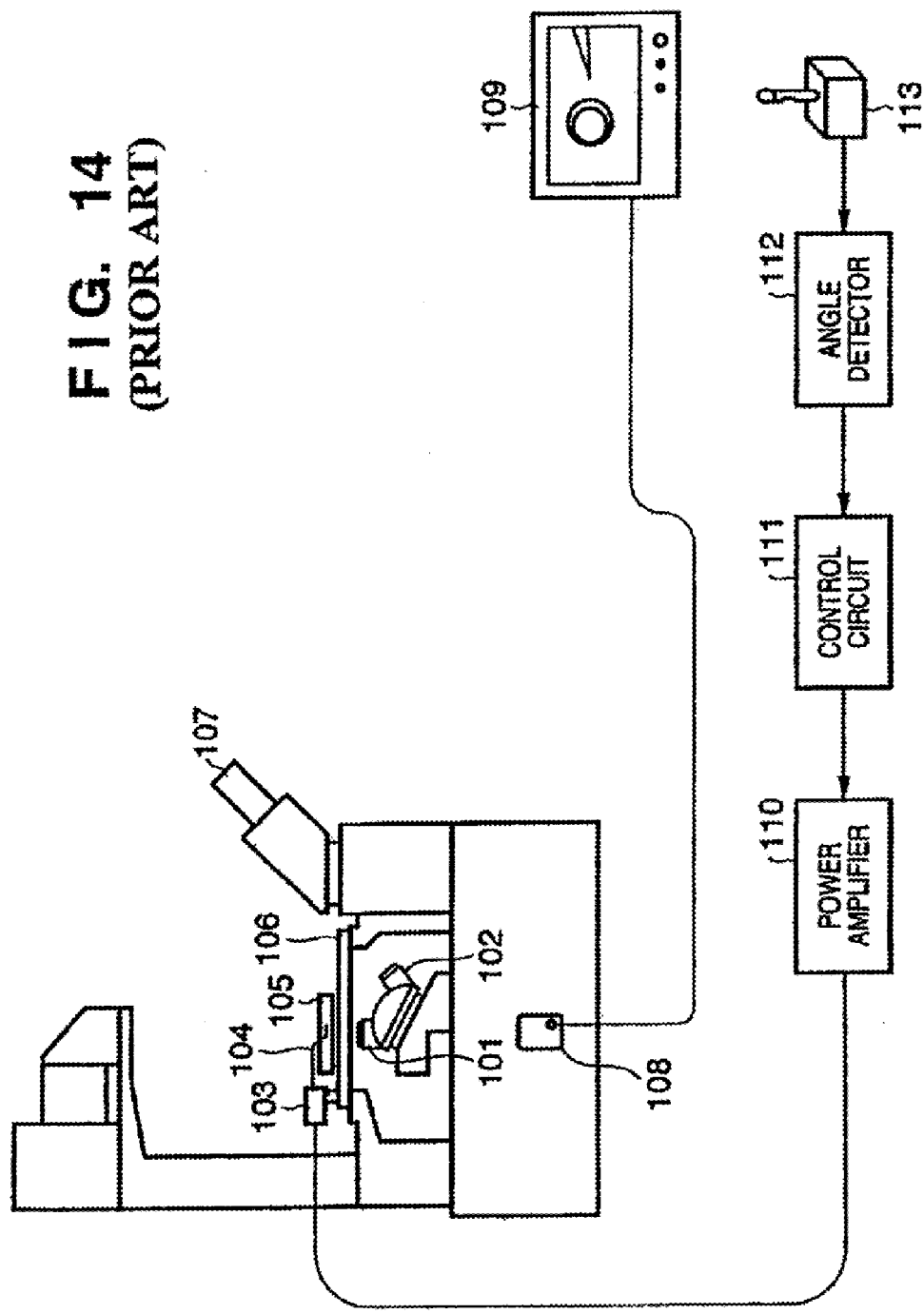
FIG. 14 is a view showing a conventional general minute object manipulating apparatus.

The external arrangement of this embodiment is almost the same as that shown in FIG. 14 except the wiring connection between the units.

In this embodiment, an operator 1 performs operations for, e.g., moving, posture-controlling, processing, and assembling a manipulation target object 12 such as a cell while observing the manipulation target object 12 and a tool 11 by using a microscope device 100 (the microscope device 100 has a microscope control circuit 4, zoom driving circuit 5, and zoom lens 6 as main components).

The microscope device 100 has the zoom lens 6. The operator 1 can continuously set arbitrary magnifications within a predetermined range by giving a magnification command to the microscope control circuit 4 to control the zoom driving circuit 5. A magnified image observed at this time is photographed by a CCD camera 3. The operator 1 can observe the image on a monitor 2.

The magnified image observable through the monitor 2 and the magnified image observed through the microscope devices 4 to 6 do not always have the same magnification. The monitor 2 normally displays a magnified image with a magnification of its own by appropriately changing the magnification of the microscope device 100. The degree of change (magnifying display adjustment ratio) can be set by the operator 1 by operating an operation window displayed on the monitor 2.

Figure 2:
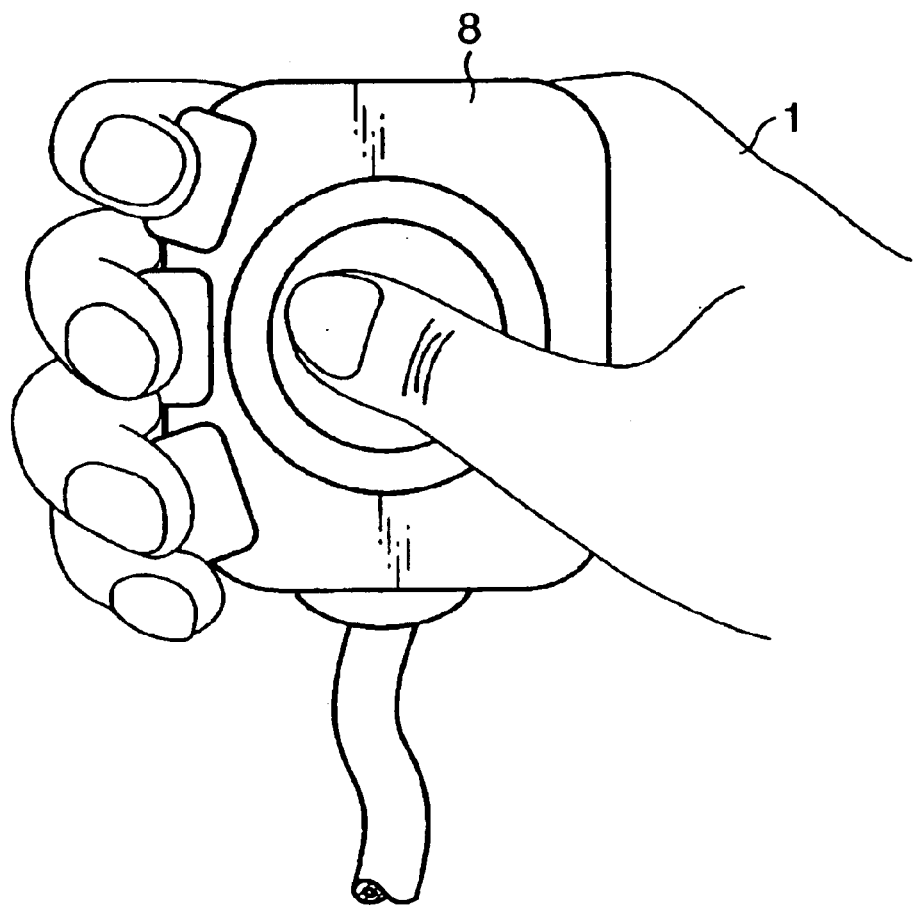
FIG. 2 is a view showing an example of an input device which can be used in the first embodiment of the present invention.
Figure 3:
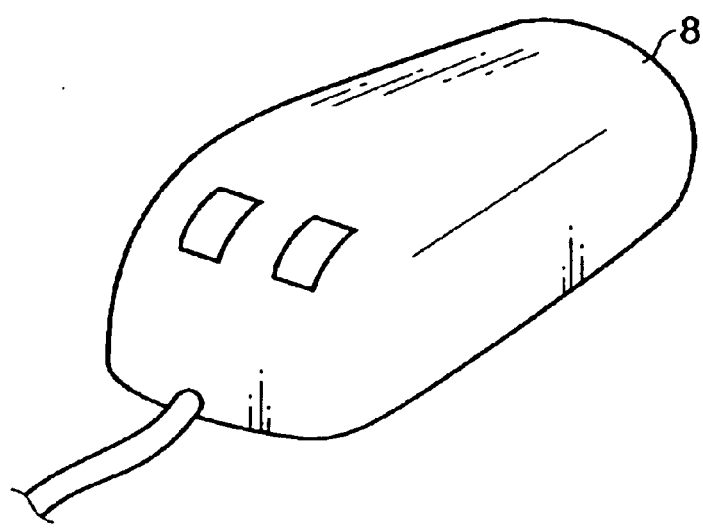
FIG. 3 is a view showing another example of the input device which can be used in the first embodiment of the present invention.

A command to the tool 11 is given by operating a pointing device. (command input unit) 8 such as a joystick, mouse, or trackball as shown in FIG. 2 or 3. Such a pointing device has a rotary encoder (not shown) or potentiometer (not shown) so that a manipulation command corresponding to the tilt angle or moving distance is sent to a tool control circuit 9.

Figure 13:
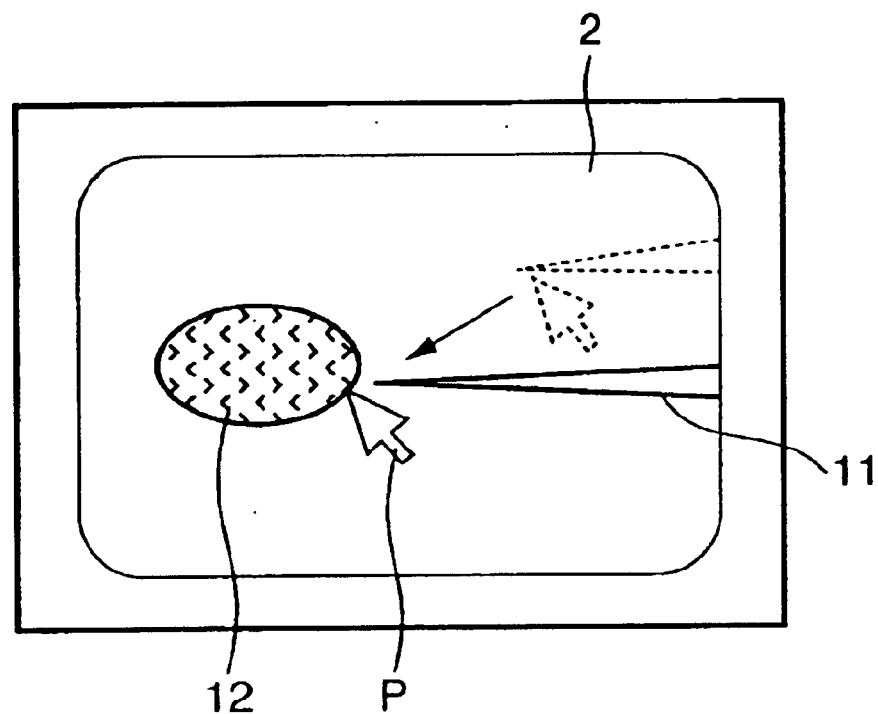
FIG. 13 is a view showing an example in which a pointer which indicates a tool position on a monitor is used.

When a pointer p is displayed on the monitor 2, as shown in FIG. 13, and the pointer p which indicates the position of the tool 11 on the monitor 2 is also moved in correspondence with the movement of the command input unit (e.g., a light pen) 8, the operation can intuitively be grasped.

A gain arithmetic circuit 7 detects or inputs the zoom magnification of the microscope and also receives monitor information (image information). The gain arithmetic circuit 7 calculates a gain Ga to drive the tool 11 on the basis of both of the zoom magnification of the microscope device 100 and the monitor image information or pixel information (the magnifying display adjustment ratio of the monitor image).

The gain is set such that the amount of the command signal (command manipulated variable) given from the command input unit 8 and the moving amount of the end effector of the tool 11 on the monitor 2 have an almost predetermined relationship independently of the zoom magnification of the microscope and the magnifying display adjustment ratio of the monitor image. Let A be the zoom magnification of the microscope, B be the magnifying display adjustment ratio of the monitor image, which is added to the zoom magnification, and Ga be the driving gain. The gain is calculated such that $Ga \propto 1/(AB)$ almost holds.

The calculated gain is multiplied by the signal from the command input unit 8 and input to the tool control circuit 9. On the basis of the tool driving signal from it, a tool driving circuit 10 drives the tool 11. Accordingly, the input amount of the command input unit 8 (the manipulated variable by the operator 1) and the movement on the monitor 2 are in proportion to each other while holding the almost predetermined relationship independently of the zoom magnification of the microscope device 100 and the magnifying display adjustment ratio of the monitor image.

Figure 4:
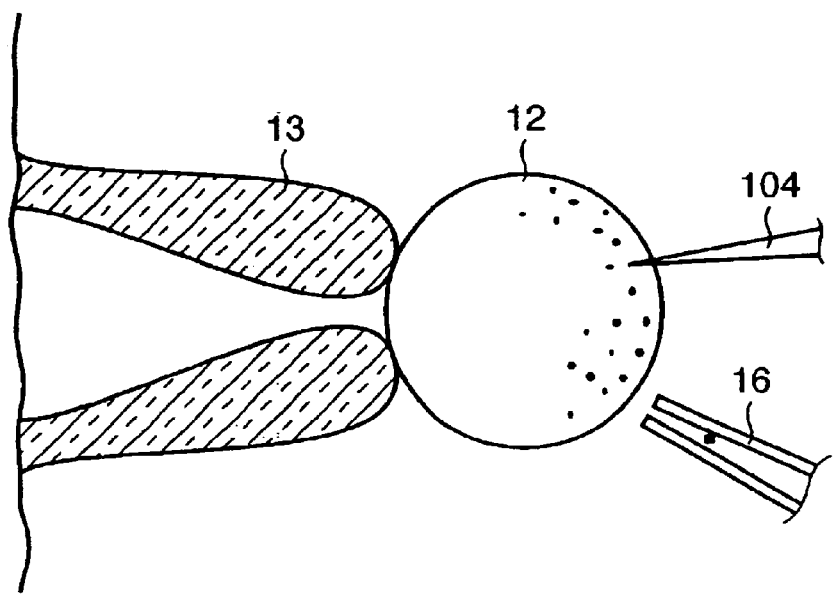
FIG. 4 is a view showing a micropipette and perforator, which can be used in the first embodiment of the present invention.
Figure 5:
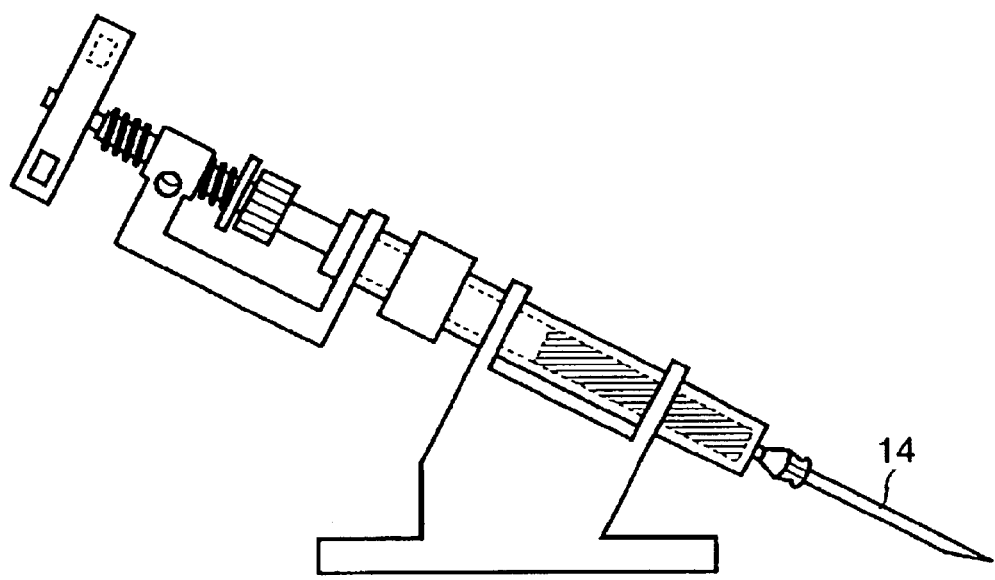
FIG. 5 is a view showing an injector which can be used in the first embodiment of the present invention.
Figure 6:
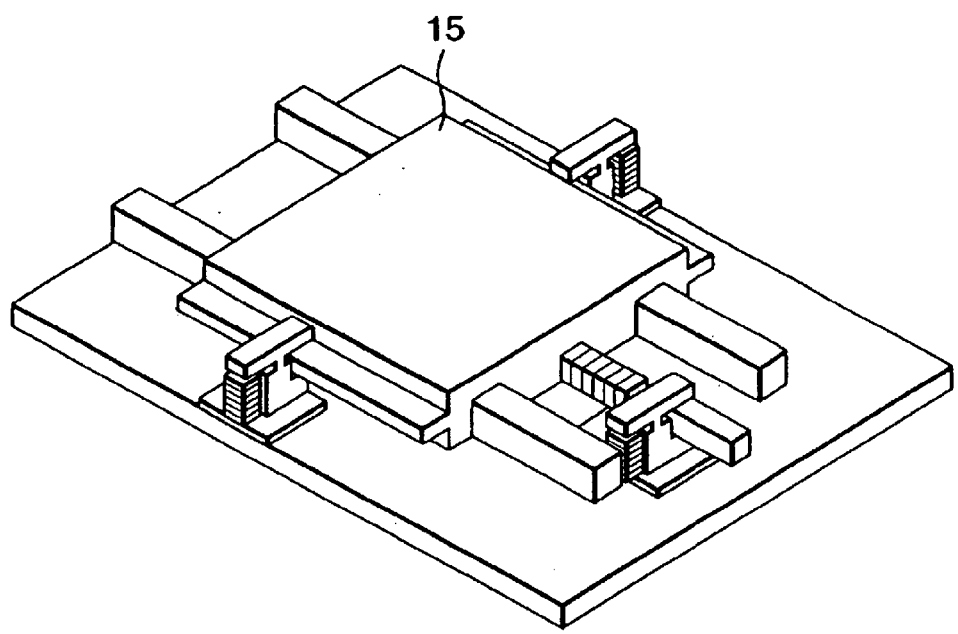
FIG. 6 is a view showing a stage device which can be used in the first embodiment of the present invention.

In the above description, the tool 11 includes a manipulator 103 and perforator 104 shown in FIG. 4 or 14, micropipettes 13 and 16 shown in FIG. 4, an injector 14 shown in FIG. 5, and a stage device 15 shown in FIG. 6.

Referring to FIG. 4, a cell as the manipulation target 12 is processed by using the holding micropipette 13, perforator (microneedle) 104, and micropipette 16 which injects a nucleus.

In this processing, the distal end of the tool 11 displayed on the monitor 2 exhibits almost the same movement independently of the zoom magnification of the microscope device 100 and the magnifying display adjustment ratio of the monitor image in correspondence with a command with the same manipulated variable from the command input unit 8 as shown in FIG. 2 or 3. Hence, the work executed while observing the monitor 2 becomes very effective, and an accident due to an excessively large manipulation input can be prevented.

Assume that a particle such as a nucleus is to be injected by using the injector 14 shown in FIG. 5, which injects an additive such as adhesive or a nucleus into a minute object, while observing the particle. In the prior art, if the observation magnification is high, the particle is largely moved even by a slight movement of the command input unit 8. For this reason, the target object may be damaged, or particles more than necessary may be injected.

To the contrary, according to the arrangement of this embodiment, since the input signal from the command input unit 8 and the movement of the observed image always have an almost predetermined relationship, both coarse movement and fine movement can smoothly be executed.

For example, to move the manipulation target object, the manipulator is used, or the stage is moved. Even in moving the stage device 15 as shown in FIG. 6, the same effect as described above can be obtained by changing the driving gain for the input signal in correspondence with the magnification on the monitor 2, as in this embodiment. Hence, workability can largely be increased.

The gain of the gain arithmetic circuit 7 need not strictly be inversely proportional to the magnification on the monitor 2. For example, the gain may be decreased when the final magnification by the zoom magnification of the microscope device 100 and the magnifying display adjustment ratio of the monitor 2 becomes large. Even in such a relationship in which a change on one side causes a change in the reverse direction on the other side, a similar effect for increasing the operability can be obtained.

The zoom mechanism of the microscope device 100 may be replaced with a revolver-type magnifying mechanism as shown in FIG. 14. More specifically, the zoom mechanism of the microscope device 100 or the magnifying display adjustment ratio setting mechanism of the monitor 2 can employ any arrangement as far as the final display magnification can be obtained by the gain arithmetic circuit 7 upon receiving the magnification of the zoom mechanism and the magnifying display adjustment ratio of the monitor.

(Second Embodiment)

Figure 7:
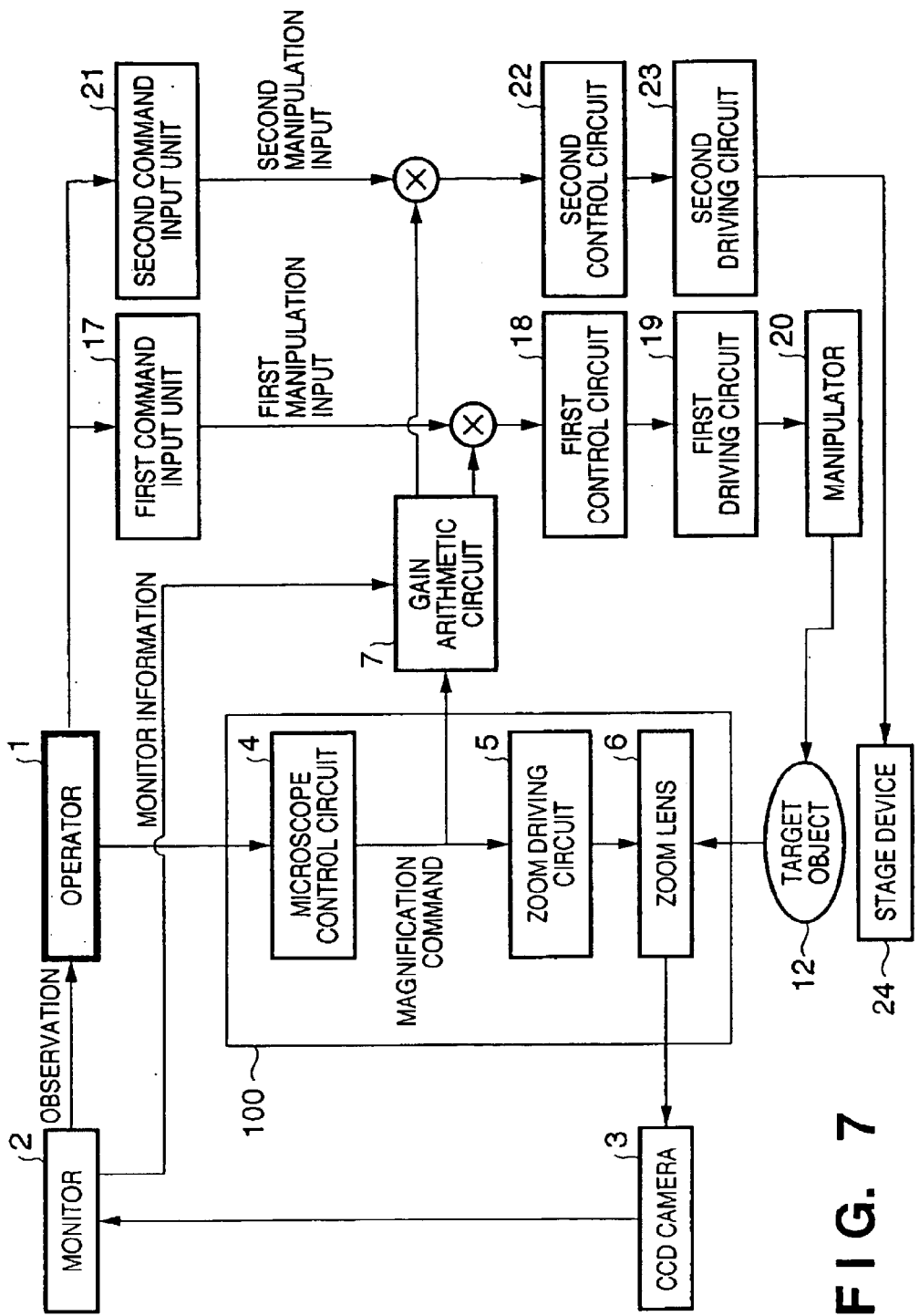
FIG. 7 is a block diagram showing the arrangement of the second embodiment of the present invention.

FIG. 7 is a block diagram of a minute object manipulating apparatus according to the second embodiment of the present invention.

A microscope device 100 and monitor 2 are the same as in the first embodiment. A gain arithmetic circuit 7 also executes the same operation as in the first embodiment.

In the second embodiment, reference numerals 17 to 19 denote, respectively, a first command input unit which executes manipulation input (first manipulation input) of a manipulator 20, a first control circuit which controls the manipulator 20, and a first driving circuit which drives the manipulator 20 under the control of the first control circuit. These components constitute the driving system of the manipulator 20 (corresponding to, e.g., the manipulator 103 shown in FIG. 14).

The driving operation of the manipulator 20 is decided by the product of the output from the gain arithmetic circuit 7 and the signal from the first command input unit 17 which is implemented by a pointing device as shown in FIG. 2 or 3.

Similarly, reference numerals 21 to 23 denote, respectively, a second command input unit which executes manipulation input (second manipulation input) of a stage device 24, a second control circuit which controls the stage device 24, and a second driving circuit which drives the stage device 24 under the control of the second control circuit. These components constitute the driving system of the stage device 24 (corresponding to, e.g., the stage device 15 shown in FIG. 6).

The driving operation of the stage device 24 is also decided by the product of the output from the gain arithmetic circuit 7 and the signal from the second command input unit 21 which is implemented by a pointing device as shown in FIG. 2 or 3, like the manipulator 20.

With the above arrangement, both the operation of the manipulator 20 on the monitor 2 and the movement, on the monitor 2, of the stage device 24 with a target object such as a cell mounted on it are decided by the manipulated variables of the first and second command input units 17 and 21 independently of the final display magnification. For this reason, the workability in cooperation of a plurality of tools increases.

FIG. 7 shows, as an example, the combination of the manipulator 20 and stage device 24. Any other combination can be employed as long as a plurality of tools are controlled with the same gain calculated from the final display magnification. More specifically, two or more tools shown in FIGS. 4 to 6 or other tools may the combined, and the manipulation gain may be determined by the gain arithmetic circuit 7. Even in this arrangement, the zoom mechanism of the microscope may be replaced with a revolver-type magnifying mechanism as shown in FIG. 14, as in the first embodiment.

(Third Embodiment)

Figure 8:
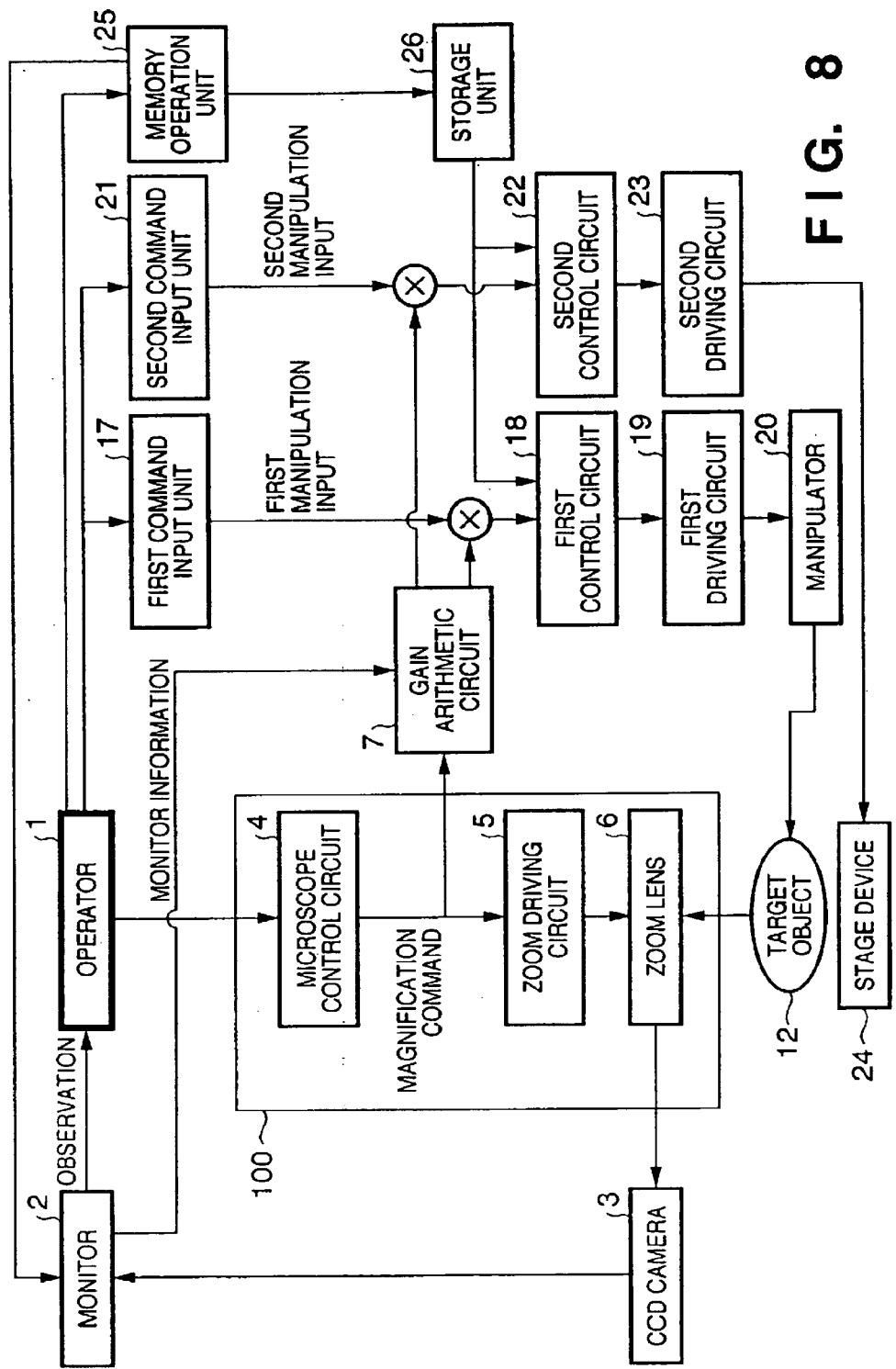
FIG. 8 is a block diagram showing the arrangement of the third embodiment of the present invention.

FIG. 8 is a block diagram of a minute object manipulating apparatus according to the third embodiment of the present invention.

FIG. 8 shows an arrangement obtained by adding a storage unit 26 and a memory operation unit 25 to the arrangement of the minute object manipulating apparatus according to the second embodiment shown in FIG. 7.

Referring to FIG. 8, the storage unit 26 stores tool driving information desired by an operator 1. The storage unit 26 is implemented by a RAM, a programmable nonvolatile memory (EEPROM), hard disk, or the like.

Tool driving information contains, e.g., the relationship between the manipulated variable of a command input unit and the driving distance of a tool. This relationship normally changes depending on, e.g., the preferences of the operator. For example, there are operators who prefer a relatively large tool driving distance corresponding to a relatively small manipulated variable, and vice versa.

The tool driving distance is a magnified amount observed on a monitor 2. To cope with a plurality of users, the storage unit 26 can store tool driving information corresponding to each of the plurality of users. If the relationship changes depending on the type of tool, the tool driving information can be stored for each tool.

Referring to FIG. 8, the operator 1 operates the memory operation unit 25 to select or load tool driving information, or rewrite or initialize (default) the storage unit 26. When the operation interface (operation menu) of the memory operation unit 25 is displayed on the monitor 2, the space can be saved, and the operability can be increased. The memory operation unit 25 may be a simple switch such as a push switch, DIP switch, or jumper.

Figure 9:
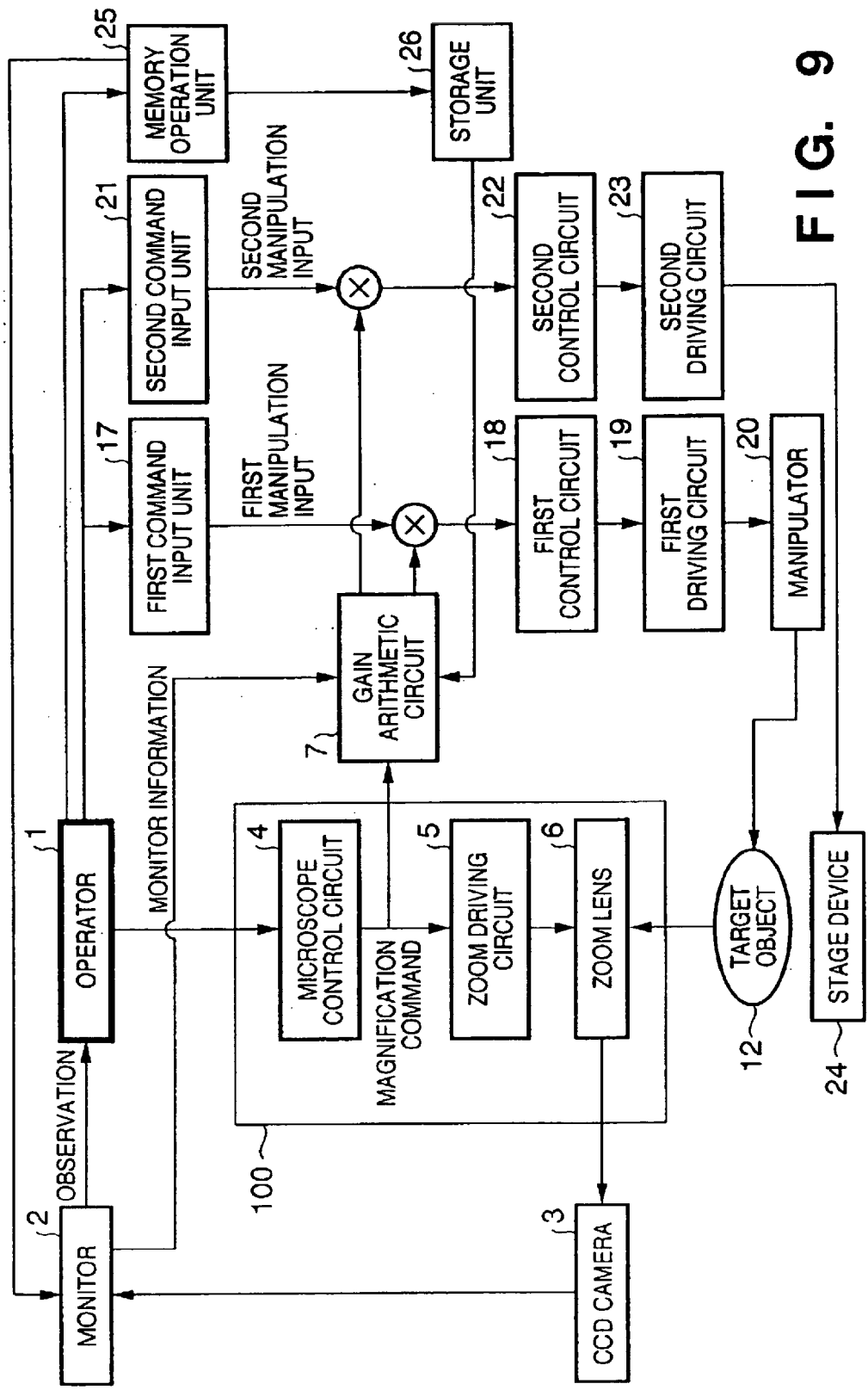
FIG. 9 is a block diagram showing the arrangement of a modification to the third embodiment of the present invention.

FIG. 9 shows the arrangement of a modification to the third embodiment.

In the arrangement shown in FIG. 8, tool driving information from the storage unit 26 is loaded to first and second control circuits 18 and 22 for each tool. In the example shown in FIG. 9, tool driving information common to the first and second control circuits 18 and 22 is loaded for each user. In this arrangement, no fine setting for each tool can be done, unlike FIG. 8. However, since driving information need not be stored for each tool, the memory capacity of the storage unit 26 can be saved.

As described above, in this embodiment, when a plurality of operators should manipulate minute objects, the tool manipulation mode can be set for each operator.

(Fourth Embodiment)

Figure 10:
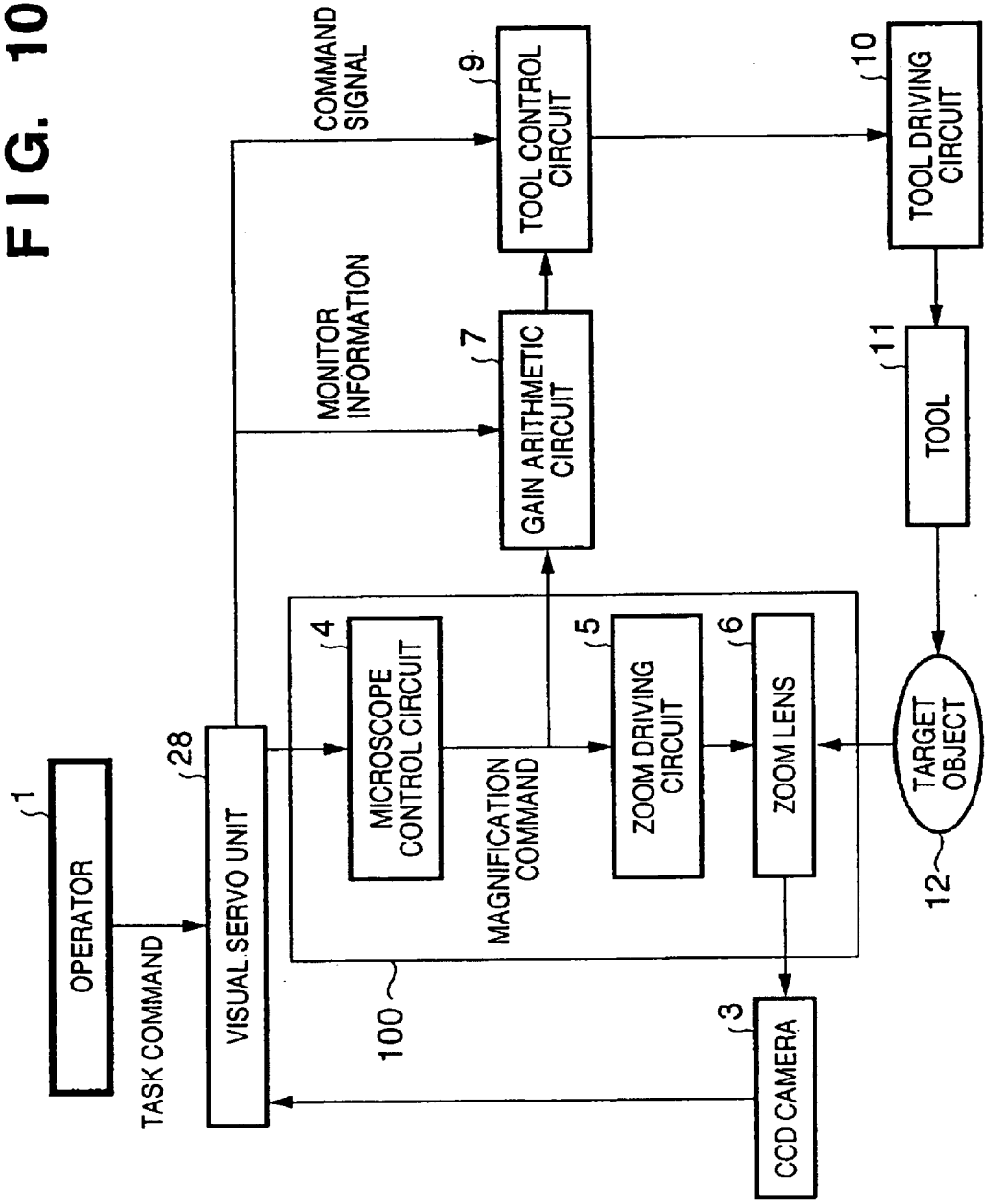
FIG. 10 is a block diagram showing the arrangement of the fourth embodiment of the present invention.

FIG. 10 is a block diagram of a minute object manipulating apparatus according to the fourth embodiment of the present invention.

In this embodiment, reference numeral 28 denotes a visual servo unit. To execute a task given by an operator 1, the visual servo unit 28 controls a microscope device 100 and tool 11 on the basis of image information obtained from the microscope device 100 and a CCD camera 3.

The visual servo unit 28 will briefly be described with reference to FIG. 11.

Figure 11:
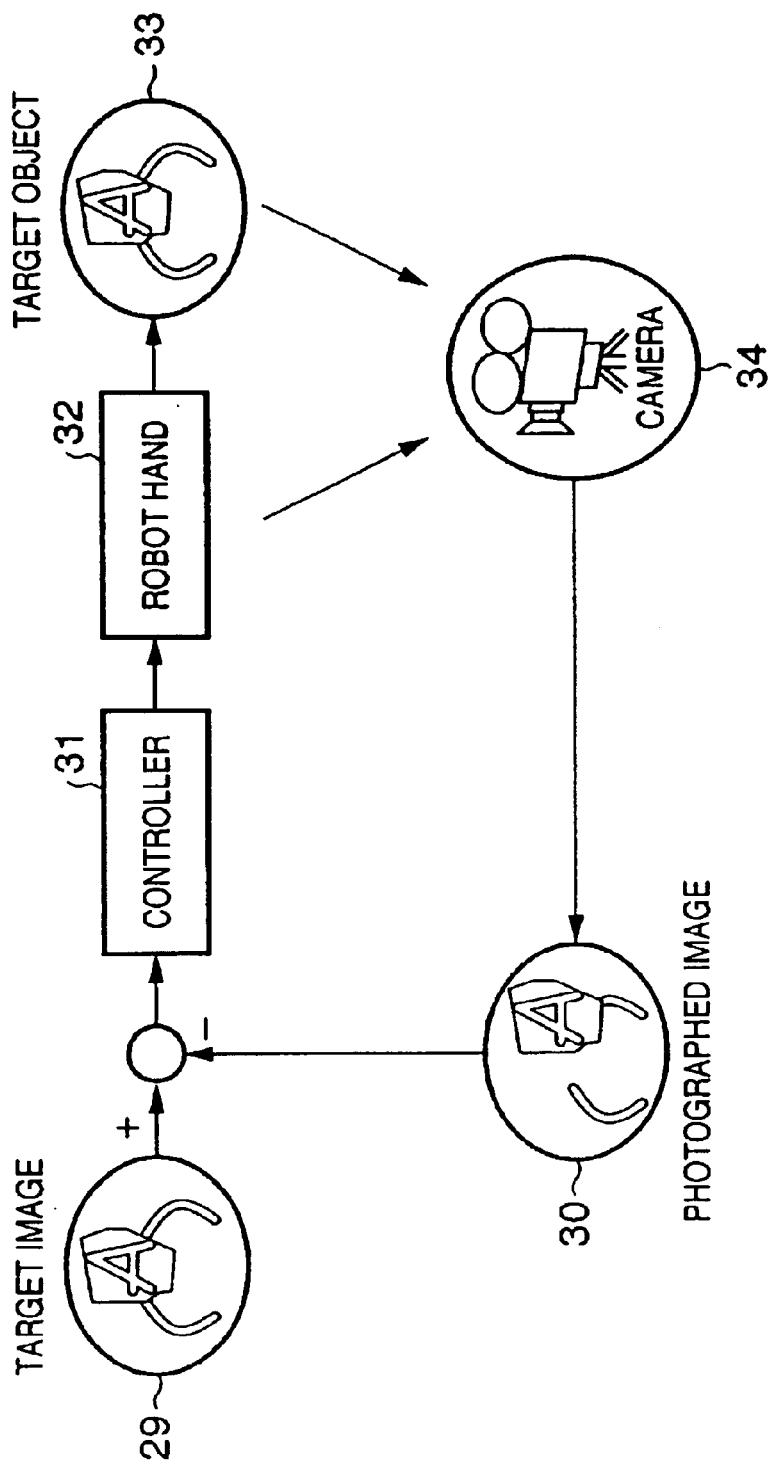
FIG. 11 is a view for explaining a visual servo according to the fourth embodiment of the present invention.

FIG. 11 shows a method called vision-based visual servo.

In this method, the operator 1 gives a target image 29 to the visual servo unit 28 in advance and causes a controller 31 for PID control or the like to manipulate a robot hand 32 which handles a target object 33 and a camera 34 serving as an image photographing means such that the deviation between the target image 29 and a photographed image 30 obtained by the camera 34 becomes small.

Another example of visual servo is a robot-based visual servo which extracts space coordinates from image information and executes manipulation. In either method, visual servo requires no expensive microscale and is therefore suitable for handling of a minute object. As a characteristic feature, this method is resistant against disturbance noise.

In visual feedback, control is executed on the basis of image information. Hence, when zooming is performed, control becomes unstable unless the manipulation gain of a tool must be set again every time. In this embodiment, however, the manipulation gain is automatically calculated on the basis of the magnification of the microscope device 100 and monitor information. For this reason, stable control can always be executed.

FIG. 10 shows one tool 11. Instead, a minute object manipulating apparatus which uses a plurality of tools may be formed, as in the second embodiment.

(Fifth Embodiment)

Figure 12:
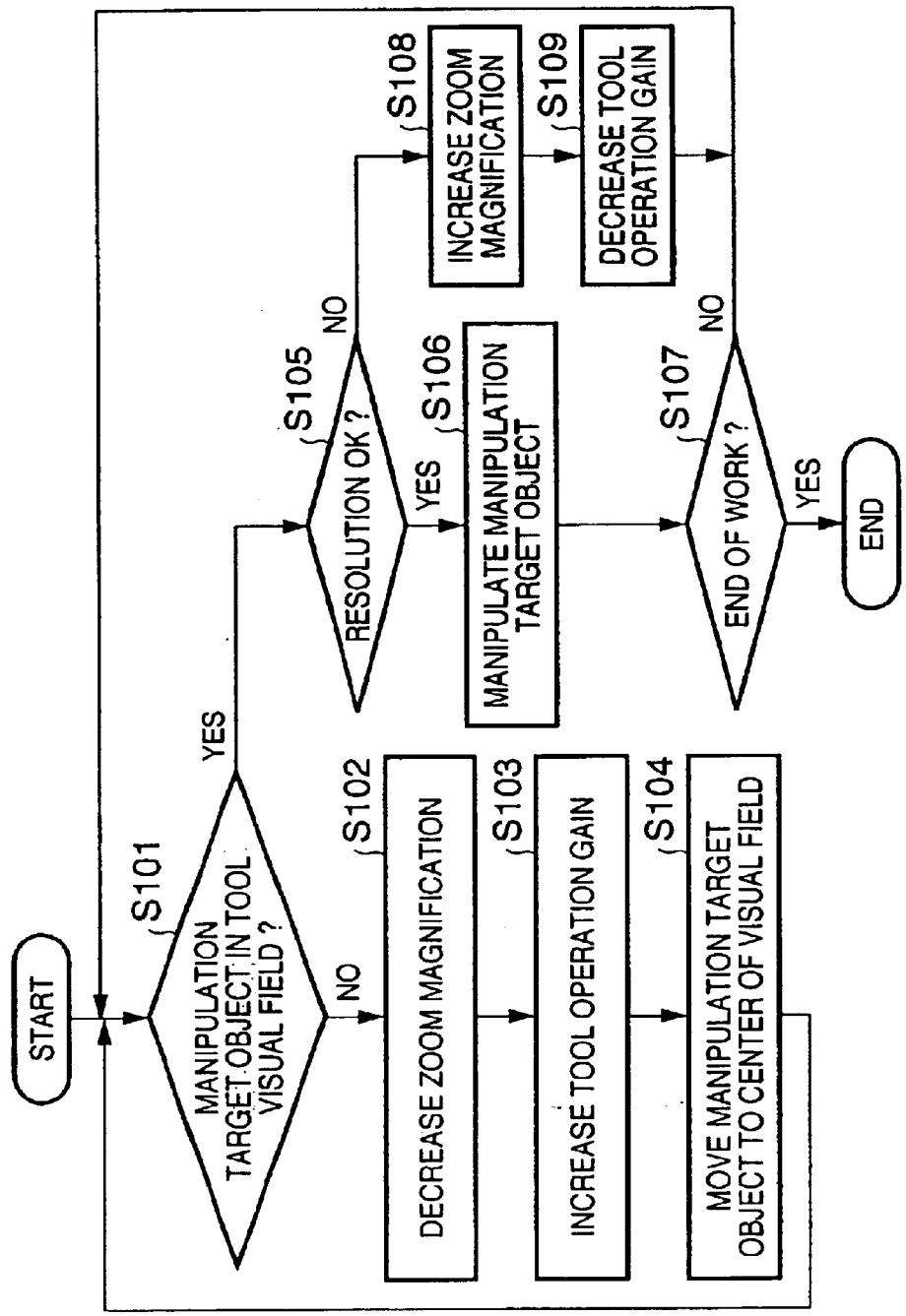
FIG. 12 is a flow chart of the fifth embodiment of the present invention.

FIG. 12 is a flow chart of the operation of a minute object manipulating apparatus according to the fifth embodiment of the present invention.

The hardware configuration of this embodiment can be obtained by adding a controller which executes the operation shown in the flow chart in FIG. 12 to any one of the arrangements shown in FIGS. 1 and 7 to 10.

In this embodiment, it is determined first whether the manipulation target object is outside the visual field of the tool (step S101).

If the manipulation target object is outside the visual field of the tool (NO in step S101), ① the zoom magnification is decreased (the magnifying display adjustment ratio of the monitor may automatically be switched) (step S102), ② the manipulation gain of the tool is increased (step S103), or ③ the manipulation target object is moved to the center of the visual field (step S104). After that, the flow returns to step S101.

After the manipulation target object is placed at the center of the visual field in the above-described way, the magnification is increased to the necessary value again. At this time, the manipulation gain of the tool is increased in synchronism with the zoom magnification (or switching of the magnifying display adjustment ratio of the monitor). With the series of operations, the state can smoothly shift to a state in which the manipulation target object is located at the center of the visual field, and the necessary resolution is obtained.

This shift is actually executed in accordance with the following procedures.

If it is determined in step S101 that the manipulation target object is not outside the visual field of the tool (YES in step S101), it is determined whether the resolution has a value necessary for manipulation (step S105). If it is the necessary resolution (YES in step S105), the manipulation target object is manipulated (step S106). Then, it is determined whether the work is to be ended (step S107).

If the work is to be ended (YES in step S107), the processing is ended. If the work is not to be ended yet (NO in step S107), the flow returns to step S101.

If it is determined that the resolution does not have the necessary value (NO in step S105), ① the zoom magnification is increased (the magnifying display adjustment ratio of the monitor may automatically be switched) (step S108) or ② the manipulation gain of the tool is decreased (step S109). After that, the flow returns to step S101.

Even when the manipulation target object or tool is going to move out of the visual field upon manipulation, it can automatically be avoided.

As described above, according to the present invention, in the minute object manipulating method and apparatus for manipulating a minute object such as a cell, the work can smoothly be executed independently of the magnification of the observation system (the magnification based on both the magnification of the observation means such as an optical microscope and the magnifying display adjustment ratio of the display means).

The present invention is not limited to the above embodiments and various changes and modifications can be made within the spirit and scope of the present invention. Therefore, to apprise the public of the scope of the present invention, the following claims are made.

What is claimed is:

1. A minute object manipulating apparatus comprising:
   a tool which manipulates a manipulation target object;
   observation means capable of changing a magnification for observating the manipulation target object and said tool;
   display means capable of changing a magnification for displaying magnified images of the manipulation target object and said tool, which are observed by said observation means;
   command input means for causing an operator to input a manipulation command signal of said tool;
   gain arithmetic means for deciding a driving gain to drive said tool on the basis of the magnification of said observation means and image information on said display means; and
   control means for controlling driving of said tool on the basis of the driving gain and the manipulation command signal.

2. The apparatus according to claim 1, wherein said observation means is a microscope capable of continuously changing the magnification.

3. The apparatus according to claim 1, wherein said gain arithmetic means decides the driving gain so as to ensure a substantially predetermined relationship between an amount of the manipulation command signal from said command input means and a moving amount of a distal end of said tool displayed on said display means independently of the magnification of said observation means and a magnifying display adjustment ratio of the image on said display means.

4. The apparatus according to claim 1, wherein said gain arithmetic means decides the driving gain in proportion to a reciprocal of a magnification obtained by multiplying the magnification of said observation means and a magnifying display adjustment ratio of the image on said display means.

5. The apparatus according to claim 1, further comprising storage means for storing tool driving information desired by the operator,
   wherein said control means controls driving of said tool on the basis of the driving gain, the manipulation command signal, and the tool driving information in said storage means, which is desired by the operator.

6. The apparatus according to claim 1, further comprising storage means for storing tool driving information desired by the operator,
   wherein said gain arithmetic means decides the driving gain in proportion to a reciprocal of a magnification obtained by multiplying the magnification of said observation means and a magnifying display adjustment ratio of the image on said display means, and an amount of the tool driving information in said storage means, which is desired by the operator.

7. The apparatus according to claim 1, further comprising visual control means for controlling said tool on the basis of the image information on said display means to automatically execute a job given by the operator.

8. The apparatus according to claim 1, wherein when the manipulation target object or said tool moves out of an image visual field of said display means, said control means automatically decreases one of the magnification of said observation means and the magnifying display adjustment ratio of the image on said display means, thereby synchronously increasing the driving gain of said tool.

9. A minute object manipulating method wherein a tool is driven and controlled on the basis of a magnification of observation means capable of changing the magnification for observing a manipulation target object and the tool, image information on display means capable of changing a magnification for displaying magnified images of the manipulation target object and the tool, which are observed by said observation means, and a manipulation command signal of the tool, which is input by an operator, so as to ensure a substantially predetermined relationship between an amount of the manipulation command signal from command input means and a moving amount of a distal end of the tool displayed on the display means independently of the magnification of the observation means and a magnifying display adjustment ratio of the image on the display means.

10. A manipulation method for a minute object manipulating apparatus comprising a tool which manipulates a manipulation target object, observation means capable of changing a magnification for observing the manipulation target object and the tool, and display means capable of changing a magnification for displaying magnified images of the manipulation target object and the tool, which are observed by the observation means, comprising:
   a command input step of causing an operator to input a manipulation command signal of the tool;
   a gain arithmetic step of deciding a driving gain to drive the tool on the basis of the magnification of the observation means and image information on the display means; and
   a control step of controlling driving of the tool on the basis of the driving gain and the manipulation command signal.

* * * * *

UNITED STATES PATENT AND TRADEMARK OFFICE
CERTIFICATE OF CORRECTION

PATENT NO. : 7,098,620 B2  
APPLICATION NO. : 10/803925  
DATED : August 29, 2006  
INVENTOR(S) : Tadashi Hayashi Page 1 of 2

It is certified that error appears in the above-identified patent and that said Letters Patent is hereby corrected as shown below:

On Title page item [57] ABSTRACT:

Line 4, "vating" should read --ving--.

SHEET 14:

FIG. 14, replace FIG. 14 with attached amended FIG. 14.

COLUMN 2:

Line 7, "observating" should read --observing--.

COLUMN 3:

Line 37, "observating" should read --observing--.

COLUMN 9:

Line 35, "observating" should read --observing--.

COLUMN 10:

Line 26, "decreases" should read --decreasing--.  
Line 33, "observating" should read --observing--.  
Line 48, "observating" should read --observing--.

Signed and Sealed this

Twenty-fourth Day of June, 2008

JON W. DUDAS  
*Director of the United States Patent and Trademark Office*